(No Model.)
L. THOMAS.
CENTERING DEVICE.
No. 571,584. Patented Nov. 17, 1896.
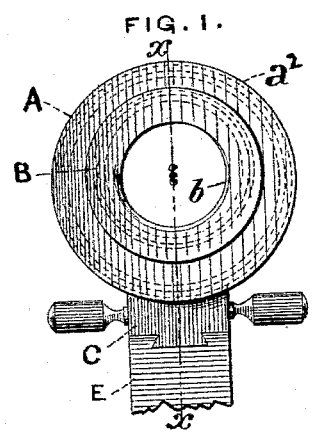
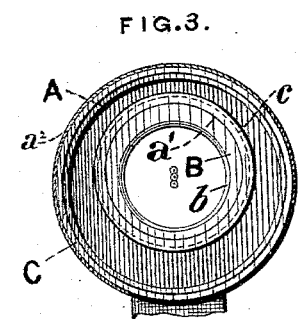
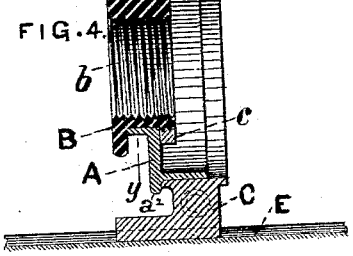
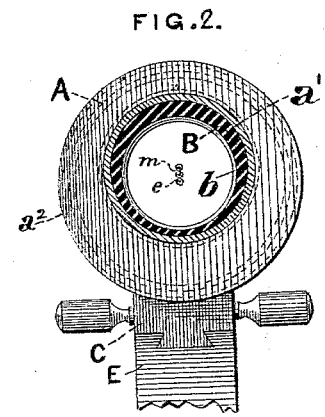
WITNESSES:
Chas. C. Collier.
Geo. A. Vaillant.
INVENTOR,
Lancaster Thomas,
Chas. B. Collier,
Atty.

UNITED STATES PATENT OFFICE.

LANCASTER THOMAS, OF PHILADELPHIA, PENNSYLVANIA.

CENTERING DEVICE.

SPECIFICATION forming part of Letters Patent No. 571,584, dated November 17, 1896.

Application filed December 7, 1894. Serial No. 531,082. (No model.)

*To all whom it may concern:*

Be it known that I, LANCASTER THOMAS, a citizen of the United States, residing at the city of Philadelphia, county of Philadelphia, and State of Pennsylvania, have invented certain new and useful Improvements in Centering Devices for Microscopes and Like Instruments, of which the following is a specification, reference being had to the accompanying drawings, in which—

Figure 1 is a front elevation of my device as applied to the substage of a microscope. Fig. 2 is a transverse section on the line $y$ $y$ of Fig. 1. Fig. 3 is a view from beneath, and Fig. 4 is a vertical section through $x$ $x$ of Fig. 1.

The object of my invention is to provide means whereby the rapid and accurate adjustment and centering of the substages of microscopes and of other instruments requiring great delicacy and accuracy of adjustment can be effected.

To this end in applying my invention to the substage of a microscope or similar structure, the support of my attachment being external thereto, I provide a cylindrical nut or bushing internally threaded for the reception of the condenser and the exterior periphery of which is eccentric to the thread. This bushing fits easily in a cylindrical sleeve or bearing, said bearing being eccentric to the line of collimation in an equal degree to the eccentricity existing between the thread and periphery of the nut or bushing already mentioned. These two parts, which are capable of free rotation one within the other, are kept together longitudinally by means of a collar suitably secured upon the interior extremity of the eccentric nut or bushing. The exterior ring is mounted, fitting easily, in a ring-bracket sliding in a groove in the supporting-post of the instrument and concentric therewith.

Referring to said drawings, Figs. 1, 2, 3, and 4, B is a flanged cylindrical nut or bushing, and is threaded internally for the reception, when applied to a microscope, of the condenser of the substage of the latter. The exterior of the flanged bushing is finished off smooth save at its inner extremity, where it is threaded to receive a retaining-collar C and is eccentric to its interior thread, the flanged part $b$ being milled exteriorly and concentric therewith for the sake of convenience and symmetry.

The cylinder B is received in a ring A, suitably formed for its reception, having, in the present instance, a Z-shaped half cross-section, Fig. 4, in such wise that the smaller cylindrical part thereof, in which the cylinder B is received, shall be concentric with the exterior thereof, ($a'$, Figs. 2 and 3,) and the larger cylindrical part of the said ring A shall be eccentric both to the inner and outer diameter of the nut or cylinder B, but concentric with the line of collimation of the instrument. The ring A is also provided with an exterior milled edge at $a^2$ for facilitating manipulation. It is recessed in the ring-bracket C, concentric with the line of collimation of the instrument, or supposedly so, any departure therefrom, either through imperfect workmanship, or accident, or other cause, being, within reasonable limits, readily corrected by my device, this being one of the features of my invention.

The ring-bracket C slides in guides, forming part of and normal to the substage and parallel to the axis or line of collimation in the usual manner.

When applied to the microscope-substage or analogous device for centering the pencil of light, produced through the condenser of a high-power microscope illuminating the subject under analysis, the focal distance having been previously effected and the condenser having been screwed into the nut B, the latter is held firmly by the operator between the finger and thumb of one hand by means of its milled edge flange, while the ring A is rotated through the milled edge $a^2$ upon its periphery by the thumb and forefinger of the other hand, or vice versa, or both may be turned in contrary or the same direction with varying speeds until the point of the pencil transfixes the object upon the slide, the reaction of one eccentric upon the other giving absolute command over a field extending around the line of collimation with a radius equal to the distance $e$, Fig. 2, from the center of collimation to the center of the condenser, when the latter is at its extreme distance from the said line of collimation, provided the distance $m$, representing the eccentricity between the exterior face $a'$ and the thread of the nut or cylinder B, shall be at least equal to the said distance $e$.

My invention is not only applicable to microscopes, but can be applied with equal facility and advantage to the centering of all analogous mechanisms or constructions requiring nice adjustments, such as the adjusting of the line of collimation in surveying as well as astronomical instruments, which is now a tedious operation, but by my method becomes rapid, effective, and permanent.

I do not claim, broadly, the use of an eccentric movement for forcing any given piece of mechanism into working position; but What I do claim as my invention in centering devices for microscopes, &c., and desire to secure by Letters Patent, is—

In a centering device, in combination, a ring-bracket C sliding in or secured to a fixed standard E, a ring-frame A fitted and revoluble therein, said ring-frame having a circular aperture $a'$ eccentric to its periphery and a cylindrical nut or bushing B fitted and revoluble therein, the said bushing being tapped internally with a thread eccentric to its periphery, the degree of eccentricity between the aperture and the periphery of the ring-frame A and the degree of eccentricity between the inner thread $b$ and periphery of the bushing B, being equal, substantially as and for the purpose set forth.

In testimony whereof I have hereunto subscribed my name in the presence of two subscribing witnesses.

LANCASTER THOMAS.

Witnesses:
CHAS. C. COLLIER,
GEO. A. VAILLANT.